Figure 1:
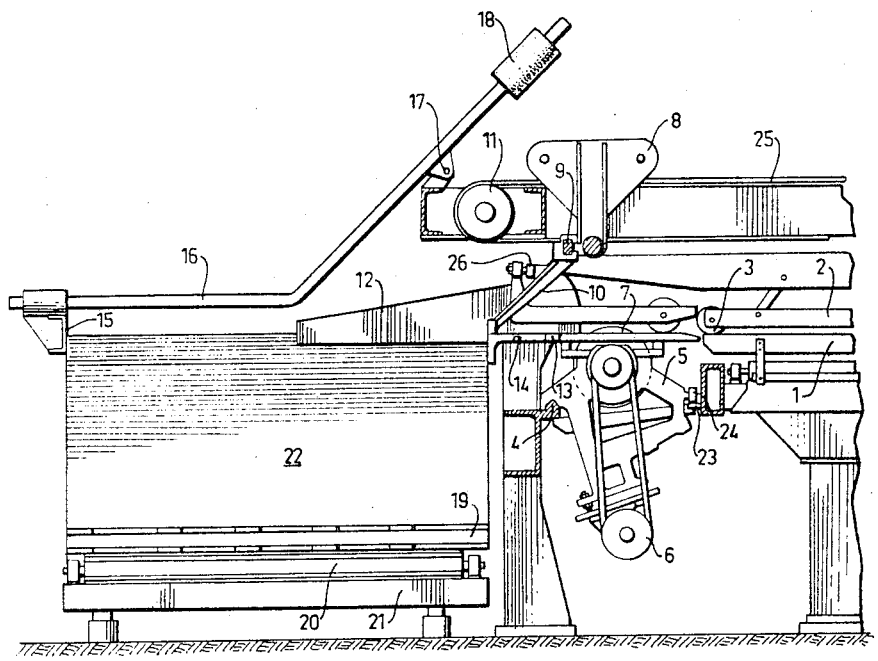

Sept. 13, 1966   J. H. BÄUML   3,272,242
DEVICE FOR SAWING AND STACKING SHEET MATERIAL
Filed April 30, 1964   2 Sheets-Sheet 1

Inventor
Johannes Hans Bäuml
By Pierce, Scheffler & Parker
Attorneys

United States Patent Office 3,272,242
Patented Sept. 13, 1966

3,272,242
DEVICE FOR SAWING AND STACKING
SHEET MATERIAL
Johannes Hans Bäuml, Sundsvall, Sweden, assignor to
Aktiebolaget Mohogs Mekaniska Verkstad, Sundsvall,
Sweden, a company of Sweden
Filed Apr. 30, 1964, Ser. No. 365,235
Claims priority, application Sweden, May 3, 1963,
4,908/63; June 20, 1963, 6,904/63
2 Claims. (Cl. 143—48)

The invention relates to a device for the sawing and subsequent stacking of wood fibre board and similar slabs, comprising a transport table, a plurality of saw blades arranged at one side of the transport table, the saw blades being movable laterally to allow sawing various sizes, and a feeder for feeding the sheets during the sawing, said feeder having a plurality of feeding arms arranged to engage with the rear edge of the sheet thus pushing the sheet forward. In known devices of this type this forward pushing by the feeding arms has stopped at the saw blades. After the saw blades there have been feeding means, for instance pairs of rollers for pulling the sheet so far that the finished slabs have been fed into a stacking device.

The invention is based upon the idea that the entire transport of the sheet during the sawing and feeding into the stacking device shall be made by the feeding arms acting upon the rear edge of the sheet. This produces the advantage that a separate feeder for feeding the finished slabs into the stacking device is not required, and the advantage that the sheet can be subjected to an exact movement producing sawn edges which are straight and absolutely perpendicular to the other two edges.

The device of the invention is characterized in that a stacking device for the sawn slabs is arranged after the sawing device, seen in the direction of feeding, said stacking device comprising at least two vertical shafts, separated from each other by thin partition walls, the feeding arms being arranged to be adjustable, dependent on the position of the saw blades, so as to move in paths between the saw blades, and being arranged to move forward as far so to push the sawn slabs into the desired position in the shafts, the saw blades being mounted on saw carriages which are movable laterally, said saw carriages also supporting vertical plates arranged in alignment with the saw blades, said vertical plates constituting the thin partition between the shafts.

Owing to the fact that the vertical plates carried by the saw carriages constitute the partitions beween the shafts it is not necessary to move the saw blades and the partitions in two separate operations when readjusting the machine from sawing slabs of one size to sawing slabs of another size, but the partitions are moved automatically as the saw blades are moved.

The shafts used for stacking the slabs according to the invention are mainly of the type disclosed in Swedish Patent No. 187,202. The partitions provided on the saw carriages need not, according to the invention, be of such a size as to completely separate two adjacent shafts. The partitions may consist of comparatively small guide plates merely used for guiding the sawn slabs into the desired position in the shafts. In this case it is preferred to provide each shaft with a bottom which can be raised and lowered, enabling said bottom to be lowered during stacking at such a rate that the top slab of each shaft is approximately on the same level as the sheet being sawn, or a little lower. When a sawn slab is being fed into a shaft it will slide upon the underlying slab, while the partitions are guiding it laterally.

The feeding arms shall be able to move between and past the saw blades. Therefore, they must be movable laterally so that they do not collide with the saw blades, which must be movable into any desired position. The feeder which supports the feeding arms shall preferably be provided on the opposite side of the transport table with respect to the saw blades. It is preferred that the saw blades with their driving motors are arranged below the transport table, whereas the feeder is arranged above the transport table. The feeder can, as known per se, consist of a plurality of endless chains, each chain being movable laterally and being provided with at least one feeding arm. The driving means for these endless chains is arranged to stop the chains automatically when the feeding arms have reached the stacking shafts. The chains are then driven in the reverse direction. When the feeding arms have reached the start position they stop and are ready to feed another sheet.

A feeder consisting of a plurality of endless chains has the disadvantage that the chains can be stretched to different lengths, to the effect that the rear edge of the sheet will not be exactly perpendicular to the direction of sawing. Therefore, it is preferred to use a feeder of the type disclosed in British Patent No. 937,118. The embodiment which will be described below contains a feeder of said type, mounted above the transport table for the sheets. However, it is within the scope of the invention to provide the feeder below the transport table, the saw blades and their motors being provided above the transport table.

Figure 2:
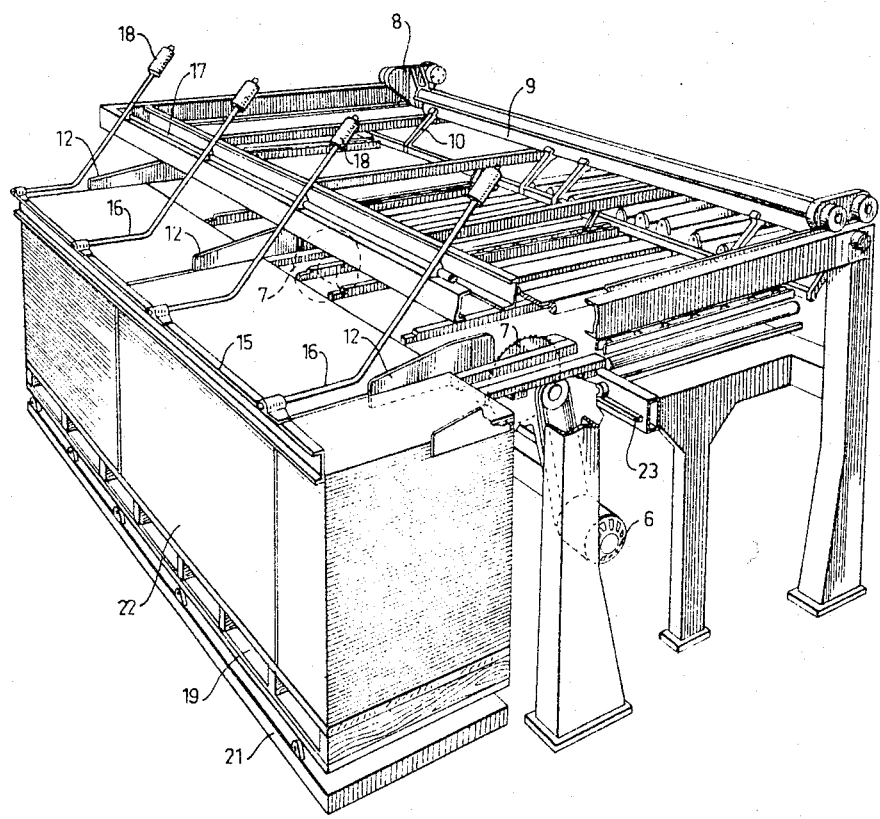

The invention is illustrated in the accompanying drawings in which
FIG. 1 is a side elevational view of the device and
FIG. 2 is a perspective view with parts broken away.

The illustrated device has a transport table 1 upon which the sheets are conveyed during the sawing, while being pressed against the transport table by a hold-down member 2 having rollers 3. The sheets are sawn by circular saw blades 7 arranged upon saw carriages 5 which also support the driving motors 6 for the saw blades. The saw carriages can be moved laterally by sliding upon a guide rail 4 and by rolling, by wheels 24, upon a rail 23 belonging to the stand of the machine. A vertical plate 12 is provided on each saw carriage in alignment with the saw blade. The plate is supported by two pins or screws extending through corresponding openings 13, 14 in the plate 12. The opening 14 is U-shaped and opens downward, allowing plate 12 to be lifted while pivoting on the pin extending through opening 13.

The sheets are fed by a carriage 8 rolling on beams 25. The carriage has a plurality of feeding arms 10. These feeding arms can be moved laterally by being slidable on a beam 9 supported by the carriage 8. The foremost position of the carriage is defined by a variable stop 26.

After the saw blades, seen in the direction of feeding, there is provided a stacking device consisting of three vertical shafts besides each other, generally designated 22. The front wall of the shafts consists of a beam 15 which can be lifted and pivoted on a horizontal pivot 17 by means of a bar 16 and a counterweight 18. The partitions between the shafts consist of the plates 12 described above. As seen in the drawing plates 12 cover only a small portion of the vertical cross-section of the shafts. It is essential that plates 12 extend somewhat above and somewhat below the level defined by the transport table 1.

Below the shafts there is a bottom 21 which can be raised and lowered by means not illustrated. The bottom supports a plurality of rollers 20 upon which boards or pallets can be conveyed so as to be placed below each shaft.

When sawing the sheets the bottom 21 and the pallets situated thereon is first raised so that the upper surface of the pallets will be on approximately the same level as the surface of the transport table 1. If, in raising the pallets they are not exactly correctly positioned, to the effect that they collide with the beam 15 or the plates 12, the beam and the plates will swing upward so that they are not damaged. As the sawing is continued the bottom 21 is lowered so that the top slabs in the shafts are all the time at the same level as the transport table 1, or somewhat lower. Consequently, the feeding arms 10 will first feed the sheets to and past the saw blades during the sawing operation, and will then feed the sawn slabs into the shafts 22. The sheets move with a high degree of accuracy, owing to their equable feeding by the feeding arms 10 and their lateral guiding by the plates 12. This high degree of accuracy makes it possible for two adjacent stacks of sawn slabs to be situated at a distance from each other which is substantially equal to the thickness of the saw blade.

The front wall of the shafts, that is the beam 15, can be omitted if the feeding arms move at a low velocity. When being fed at a high velocity the slabs have a tendency, owing to their kinetic energy, to continue after the feeding arms have stopped in the illustrated position, their movement being stopped by the beam 15.

What I claim is:

1. A device for the sawing and subsequent stacking of wood fibre board and similar slabs, comprising a transport table, a plurality of saw blades mounted on saw carriages that are movable laterally at one side of said table to allow sawing various sizes, a feeder for feeding the slabs during the sawing, said feeder having a plurality of feeding arms arranged to engage with the rear edges of the slabs, seen in the direction of feeding, a stacking device for the sawn slabs arranged after the sawing device, seen in the direction of feeding, said stacking device comprising at least two vertical shafts, the feeding arms being movable laterally, depending on the position of the saw blades, so as to move in paths between the saw blades, and being arranged to move forward as far so to push the sawn slabs into the desired position in the shafts, vertical plates supported by said saw carriages in alignment with the saw blades, said vertical plates constituting thin partitions between said shafts.

2. A device as claimed in claim 1, in which each shaft has a bottom which can be raised and lowered.

No references cited.

WILLIAM W. DYER, JR., *Primary Examiner.*

WAYMOND D. BRAY, *Examiner.*